United States Patent
Warinner et al.

(10) Patent No.: US 6,375,203 B1
(45) Date of Patent: Apr. 23, 2002

(54) FRONT AIR SPRING SUSPENSION WITH LEADING ARM TRAILING AND V-LINK

(75) Inventors: Derek K. Warinner, New Haven; Justin W. Vig; James Korson, both of Fort Wayne, all of IN (US)

(73) Assignee: International Truck and Engine Corp., Warrenville, IL (US)

( * ) Notice: Subject to any disclaimer, the term of this patent is extended or adjusted under 35 U.S.C. 154(b) by 0 days.

(21) Appl. No.: 09/370,542

(22) Filed: Aug. 9, 1999

(51) Int. Cl.⁷ .............................................. B60G 5/01
(52) U.S. Cl. ............................... 280/81.6; 280/124.128
(58) Field of Search ........................ 280/104, 124.162, 280/124.163, 124.128, 124.153, 81.6

(56) References Cited

U.S. PATENT DOCUMENTS

| | | | |
|---|---|---|---|
| 2,954,985 A | * 10/1960 | Drong | 280/81.6 |
| 3,047,306 A | * 7/1962 | Easton | 280/81.6 |
| 3,051,506 A | * 8/1962 | Stump et al. | 280/81.6 |
| 3,204,977 A | * 9/1965 | Eisenhauer et al. | 280/81.6 |
| 3,253,538 A | * 5/1966 | Brueder | 180/64 |
| 3,291,503 A | * 12/1966 | De Lay | 280/81.6 |
| 3,586,346 A | * 6/1971 | Sautter | 280/124 |
| 3,768,829 A | * 10/1973 | Colovas et al. | 280/124 R |
| 3,894,602 A | * 7/1975 | Von Der Ohe | 180/43 R |
| 4,120,509 A | * 10/1978 | Reeve et al. | 280/81 A |
| 4,313,518 A | * 2/1982 | Ledwinka et al. | 180/233 |
| 4,415,179 A | * 11/1983 | Marinelli | 280/713 |
| 4,667,974 A | * 5/1987 | Giese | 280/81 A |
| 5,183,283 A | * 2/1993 | Jarlsson | 280/426 |
| 5,220,972 A | * 6/1993 | Proia | 180/24.01 |
| 5,362,095 A | * 11/1994 | Eveley | 280/712 |
| 5,364,113 A | * 11/1994 | Goertzen | 280/81.6 |
| 5,458,360 A | * 10/1995 | Raidel, Sr. | 280/686 |
| 5,492,351 A | * 2/1996 | Salo | 280/81.6 |
| 5,636,857 A | * 6/1997 | Tandy, Jr. et al. | 280/692 |
| 5,678,845 A | * 10/1997 | Stuart | 280/689 |
| 5,722,673 A | * 3/1998 | Mauz | 280/96.1 |
| 5,820,147 A | * 10/1998 | Rohweder et al. | 280/93.51 |
| 5,851,015 A | * 12/1998 | Klosterhaus | 280/93.51 |
| 5,873,581 A | * 2/1999 | Yale | 280/5.519 |
| 5,887,881 A | * 3/1999 | Hatch | 280/124.175 |

OTHER PUBLICATIONS

Reyco Industries Inc., Reyco 1200 Series Front Axle Suspension brochure.
Neway Anchorlok International, Neway AS–Series—RV / Bus Air Steer Suspension brochure—AS–090/120/140.

* cited by examiner

Primary Examiner—Eric Culbreth
Assistant Examiner—L. Lum
(74) Attorney, Agent, or Firm—Dennis Kelly Sullivan; Jeffrey P. Calfa; Neil T. Powell

(57) ABSTRACT

A suspension system for a vehicle frame from a steering axle has first and second controllable rate springs mounted above the steering axle and below the frame to support a portion of vehicle weight. A trailing V-link member is mounted to pivot on its vertex on a cross-member of the frame forward of the steering axle. The opposite ends of the V-link member are pivotally connected to opposing ends of the steering axle allowing the V-link member to constrain fore to aft movement of the steering axle, lateral displacement of the steering axle and frame roll. A pitman and trailing draglink from a steering gear on the frame to the steering axle controls steering. First and second shackle assemblies depend from the frame aft of the steering axle. First and second leading arms are suspended from the shackle assemblies to permit longitudinal translation of the first and second leading arms relative to the frame. The leading arms are rigidly connected to the opposing ends of the steering, axle to constrain rotation of the steering axle and the trailing V-link member about the vertex of the V-link member. Shock absorbers for damping motion between the steering axle and the frame are positioned adjacent the controllable rate springs.

12 Claims, 3 Drawing Sheets

FRONT AIR SPRING SUSPENSION WITH LEADING ARM TRAILING AND V-LINK

BACKGROUND OF THE INVENTION

1. Field of the Invention

The present invention relates to vehicle front end suspension systems and, more particularly, to an air spring based suspension system directed to improving vehicle stability by reducing front end dive during braking and increasing resistance to vehicle roll during cornering.

2. Background

Truck suspension systems must meet each of several not wholly compatible goals which include: absorbing road shock; stabilizing the vehicle; and maintaining proper axle spacing and alignment. These goals must met while supporting the vehicles weight over a wide range of vehicle load conditions and maintaining the driver's ability to steer the vehicle.

There are four basic categories of suspension systems used on trucks: spring systems, equalizing beam systems; torsion bar systems: and air spring systems. Air spring systems have recently gained in popularity and have been applied to of variety of truck axles, including of particular interest here, the steering axle. Air spring suspensions give excellent load and vibration isolation to the cab by eliminating the interleaf friction found in traditional multiple leaf spring designs. The deflection rate of air springs can be adjusted automatically to compensate for vehicle load changes. As a result, vehicle height does not vary with load or positioning of the load. In addition, an air spring usually has a lower deflection rate than a leaf spring exerting the same force giving the system greater capacity for absorbing shocks for a given displacement between the axle and the frame.

Air springs are also employed to maintain a constant vehicle height despite changes in vehicle loads. As such it may sound odd to refer to a deflection rate for such springs since the deflection rate for a compression spring equates spring deflection with force generated. Air springs, unlike conventional springs, can and are used to generate a varying amount of force while maintaining a fixed height displacement. This is effected by changing air pressure in the air spring in response to changes in vehicle height, either dumping or adding air to the air spring by valves. Conventional springs must of course deflect to generate a balancing counterforce. In effect, as air pressure is changed in an air spring in order to maintain a constant height, the deflection rate of the spring is changing. Thus, air springs may be termed controllable rate springs or controllable deflection springs.

In an air spring based system, air bellows are positioned with respect to an axle and a vehicle frame to support the frame from the axle. The air spring can be used to supplement a leaf spring arrangement by being placed between the leaf spring and the vehicle frame. Commonly though, air spring systems replace the leaf spring. In a typical application of air springs to a steering axle, an ail spring is placed adjacent each wheel over the axle and directly below the side rails of the vehicle frame. The steering axle is than stabilized using trailing connecting rods or arms between the frame rails and the steering axle. Lateral stability for the axle is provided using a lateral track bar. Where a leaf spring provided two frame mounting points fore and aft of the steering axle to aid in stability, the rigid trailing arm has only one mounting point to the frame forward of the axle. Trailing arm systems achieve substantial front end anti-roll stiffness by positioning rigid arms between the frame and the axle, with each arm being pivotally attached to the frame and rigidly attached to the axle. Trailing arm systems have proven simpler than leaf spring designs since the arms can be constructed from a steel box beam.

The trailing arm design used with air springs at the vehicle front end is not without disadvantages. During vehicle braking, the front ends of vehicles tend to dive. In traditional leaf spring suspension designs, where the leaf spring is mounted to the frame at two points, ahead of the solid axle and following the axle, the torque reaction force generated by the brakes on the axle in turn generates a reactive upward force on the frame through the leaf springs aft mounting point and a downward reactive force through the forward mounting point. No net downward force is transmitted from braking. In trailing arm/air spring suspension designs this balance is lost. Trailing arm designs transmit the brake reaction torque to the frame only through the forward trailing arm mount as a downward force and thereby increase dive. Most trailing arm designs are also poor at maintaining axle position laterally, necessitating the use of a lateral track bar to hold axle position.

Arrangements combining the use of air springs and leaf springs, while effective, lack the simplicity of the trailing arm design. Substituting a leading arm for the trailing arm would help counter the dive problem because a leading arm would transfer brake torque to the frame as an upward force. However, steering system arms and draglinks usually include a connecting rod running from a steering gear, which is mounted to the frame at a point forward to the steering axle, back to the steering axle. This rod is thus positioned as a trailing arm, giving the axle and steering arm a pivot point forward of the axle position. Were a leading arm now attached to the steering axle, the steering axle would have an additional pivot point aft of the axle, position. The steering axle cannot rotate on both a trailing pitman arm/draglink pivot point and a leading arm pivot point simultaneously. The result of such a combination is to introduce suspension steering error, compromising driver control of the vehicle.

SUMMARY OF THE INVENTION

It is an object of the invention to provide an air spring suspension system with improved vehicle stability characterized by increased resistance to front end dive on braking.

It is a further object of the invention to provide an air spring suspension system having improved resistance to roll.

It is another object of the invention to provide a suspension system which enhances steering axle lateral stability without use of a track bar.

The foregoing objects are achieved as is now described, The invention provides a suspension system for a frame from a steering axle. First and second controllable rate springs are mounted to locally support a frame from the steering axle. A trailing V-link member is mounted to pivot at its apex on a cross-member of the frame positioned forward of the steering axle. The opposite ends of the V-link member are pivotally connected to opposing ends of the steering axle allowing the V-link member to constrain fore to aft movement of the steering axle, lateral displacement of the steering axle and frame roll. A trailing draglink coupled from the frame to a wheel knuckle provides steering control. First and second shackles depend from the frame side rails aft of the steering axle. The first and second leading arms are suspended from the shackle boxes to permit longitudinal translation of the first and second leading arms relative to the frame. The leading arms are rigidly connected to the opposing ends of the steering axle to constrain rotation of the steering axle and the trailing V-link member about the vertex of the V-link member. Lastly, shock absorbers for damping motion between the steering axle and the frame are positioned adjacent the controllable rate springs.

The foregoing objects are achieved as is now described. The invention provides a suspension system for a frame from a steering axle. First and second controllable rate springs are mounted to locally support a frame from the steering axle. A trailing V-link member is mounted to pivot on its vertex on a cross-member of the frame positioned forward of the axle. The opposite ends of the V-link member ale pivotally connected to opposing ends of the steering axle allowing the V-link member to constrain fore to aft movement of the steering axle, lateral displacement of the steering axle and frame roll. A trailing draglink coupled from the frame to a wheel knuckle provides steering, control. First and second shackles depend from the frame side rails aft of the steering axle. The first and second leading arms are suspended from the shackle boxes to permit longitudinal translation of the first and second leading alms relative to the frame. The leading arms are rigidly connected to the opposing ends of the steering axle to constrain rotation of the steering axle and the trailing V-link member about the vertex of the V-link member. Lastly, shock absorbers for damping motion between the steering axle and the frame are positioned adjacent the controllable rate springs. In another embodiment of the invention, the V-link may actually be a curved U-shape and will be engaged to the cross member in two locations with a bushing at each location.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
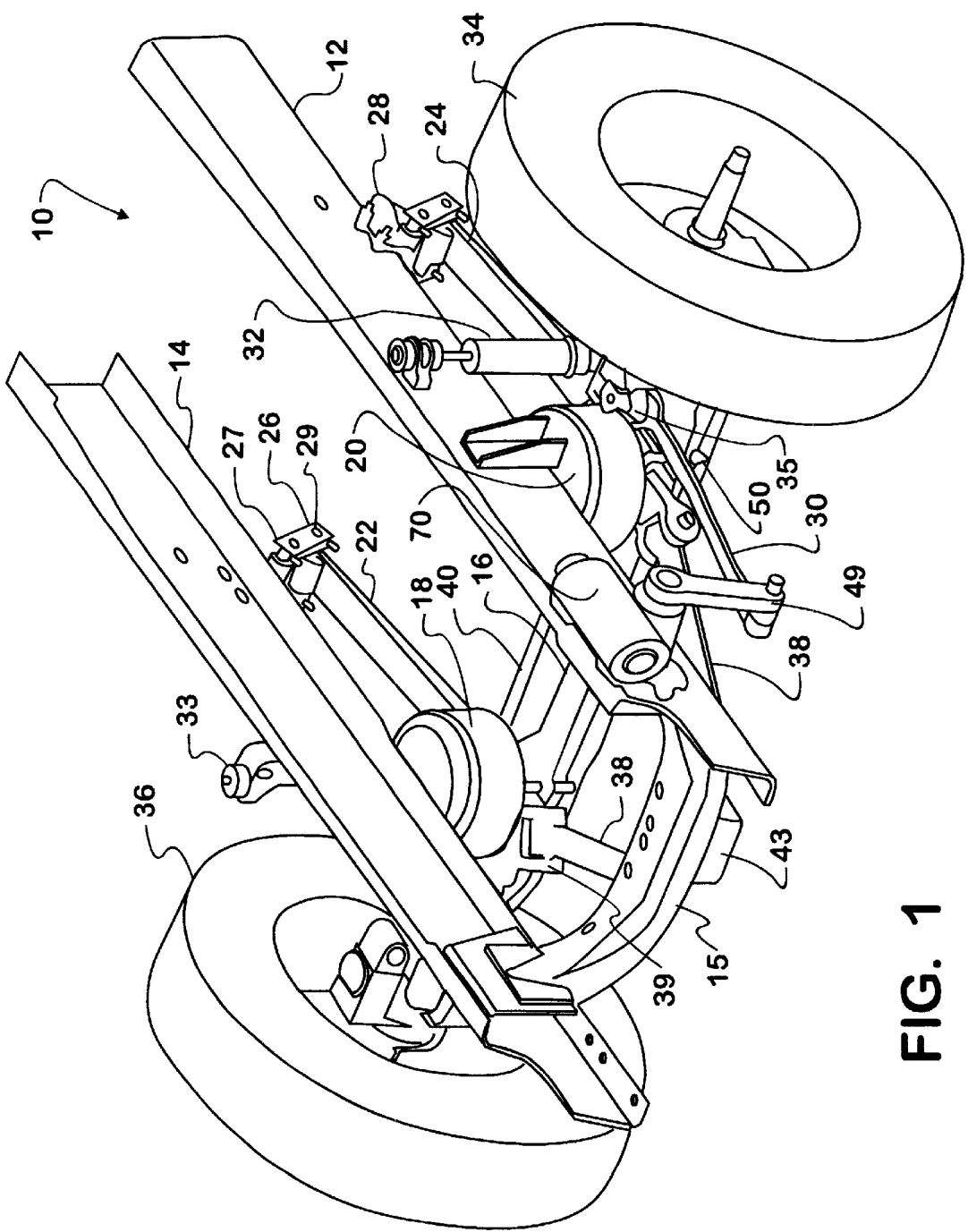
FIG. 1 is a top perspective view of a portion of a vehicle frame incorporating the invention.

FIG. 1 is a perspective view of a portion of a vehicle frame 10 on which the steering axle suspension system of the present invention has been incorporated. Vehicle frame 10 includes a left side rail 12 and a right side rail 14 which are connected by a cross member 15 near the front end of the frame. As is conventional in the art, cross member 15 is bolted between the side rail members 12 and 14 forward of steering axle 16 to hold the rail members in a parallel, longitudinal orientation. While the invention is depicted with a conventional truck frame based on left and right side longitudinal rails, it may be equally effectively applied to vehicles constructed with different types of frame assemblies or using a unibody. As used herein the terms V-link and V-link member mean a link member having a V-shape with attachment points at the apex of the member and at the ends of legs forming the open V.

Vehicle frame 10 is supported on steering axle 16 by a right side air spring 18 and a left side air spring 20. Air springs 18 and 20 are controllable deflection rate springs, meaning that the spring rate is adjusted as a function of the vehicle load and load distribution. Air springs are well-known in the art and the details of construction of the control mechanisms for the air springs have been omitted for the sake of clarity. While air springs are the most common type of controllable deflection spring, other types of controllable rate springs exist, such as those based on electromagnets. Steering axle 16 is a solid axle of a type well-known to heavy duty trucks. Air springs 18 and 20 are illustrated as mounted directly above steering axle 16 and under side rails 14 and 12 respectively. While air springs 18 and 20 support frame 10 from the steering axle 16 and provide shock absorption, they are insufficient to stabilize the position of axle 16 relative to frame 10. Although air springs are used with the preferred embodiment of the inventor other spring systems may be used.

Steering axle 16 is positionally stabilized by a trailing V-link member 38 and by two rigid leading arms 22 and 24. Trailing V-link member 38 is pivotally mounted at its apex to cross member 15 through bushing housing 43 and at endpoints adjacent steering axle 16 through terminating bushings 39 disposed at opposing ends of the V-link member. Because the pivot axis of V-link member 38 fixed by bushing 43 is parallel to steering axle 16, V-link member 38 constrains fore to aft movement and lateral movement of the axle 16 V-link member 38 also reacts to lateral acceleration of the vehicle, where frame 10 tends to lean or roll to one side. During vehicle roll, the relative distance between side rail members 12 and 14 and steering axle 16 changes causing axle 16 to twist. Frame rolling movement will tend to cause rotation of the V-link member 38 about an axis formed by its apex through bushing 43, generating resistance to roll.

The orientation of V-link member 38 can be reversed (not shown) without loss of functionality. In such an arrangement the apex of V-link in member would be pivotally mounted to steering axle 16 and the endpoints of the V-link member would be pivotally supported on the left and right side rails 12 and 14.

The V-link member 38 may be a V-link member in that the apex is not a point in another embodiment of the invention and will be engaged at the apex to the cross member 15 or the steering axle 16. depending on the mounting arrangement in two locations with a bushing at each location.

Right side leading arm 22 is connected between a shackle assembly 26 and steering axle 16. Shackle assembly 26 is mounted aft of steering axle 16 of right side rail member 14 and includes two pivoting bushings 27 and 29. Pivoting bushing mountings 27 and 29 allow the free end of shackle housing 26 to move longitudinally relative to rail member 14. Leading arm 22 is mounted to pivot on shackle housing 26, allowing the leading arm to translate back and forth in a direction longitudinally aligned with rail 14. The end of leading arm 22 distal to bushing 29 is rigidly mounted on steering axle 16 by a pair of U-bolts 50.

Similarly, a left side leading arm 24 is mounted between shackle box 28 and steering axle 16. Leading arm 24 translates fore and aft parallel to leading arm 22. Leading arms 22 and 24 constrain rotation of the subassembly comprising steering axle 16 and V-link member 38. Brake action slowing the spinning of wheels 34 and 36 generates a counterclockwise brake reaction force on axle 16. This torque effect is resisted by a reaction force applied through the line of actions through shackle boxes 26 and 28 to the frame 10. The reaction force tends to push frame 10 upwardly. Leading arms 22 and 24 respond to angular deflection between frame 10 and steering axle 16 due to body roll. Leading arms 22 and 24 bend and thereby provide a torsional input to axle 16.

Suspension stiffness is generated by the air springs 18 and 20 while damping is provided by shock absorber assemblies 32 and 33. The steering leverage is transmitted to wheels 34 and 36 from a steering gear 70 mounted on left side rail 12 to wheel knuckle 35 via pitman arm 49 and a trailing draglink 30. A steering tie rod 40 connects wheel 34 to wheel 36 to keep the wheels parallel.

Although the preferred embodiment is a trailing V-link design combined with twin leading arms, the orientation and relative position of the V-link and the arms could be reversed to provide twin trailing arms and a reverse swept leading V-link member (not-shown). Such an orientation might be utilized where drag link 30 is positioned as a leading arm rather than a trailing arm as illustrated with the preferred embodiment. As with the preferred environment, the V-link member is positioned with its apex either on or displaced from the steel-in(, axle. However, with the orientation of the components reversed, the assembly would have no advantage in preventing forward dive over prior art trailing arm designs. Still, an arrangement would still allow elimination of a lateral track bar for maintaining position laterally of axle 16 and have the roll resistance of the preferred embodiment.

Figure 2:
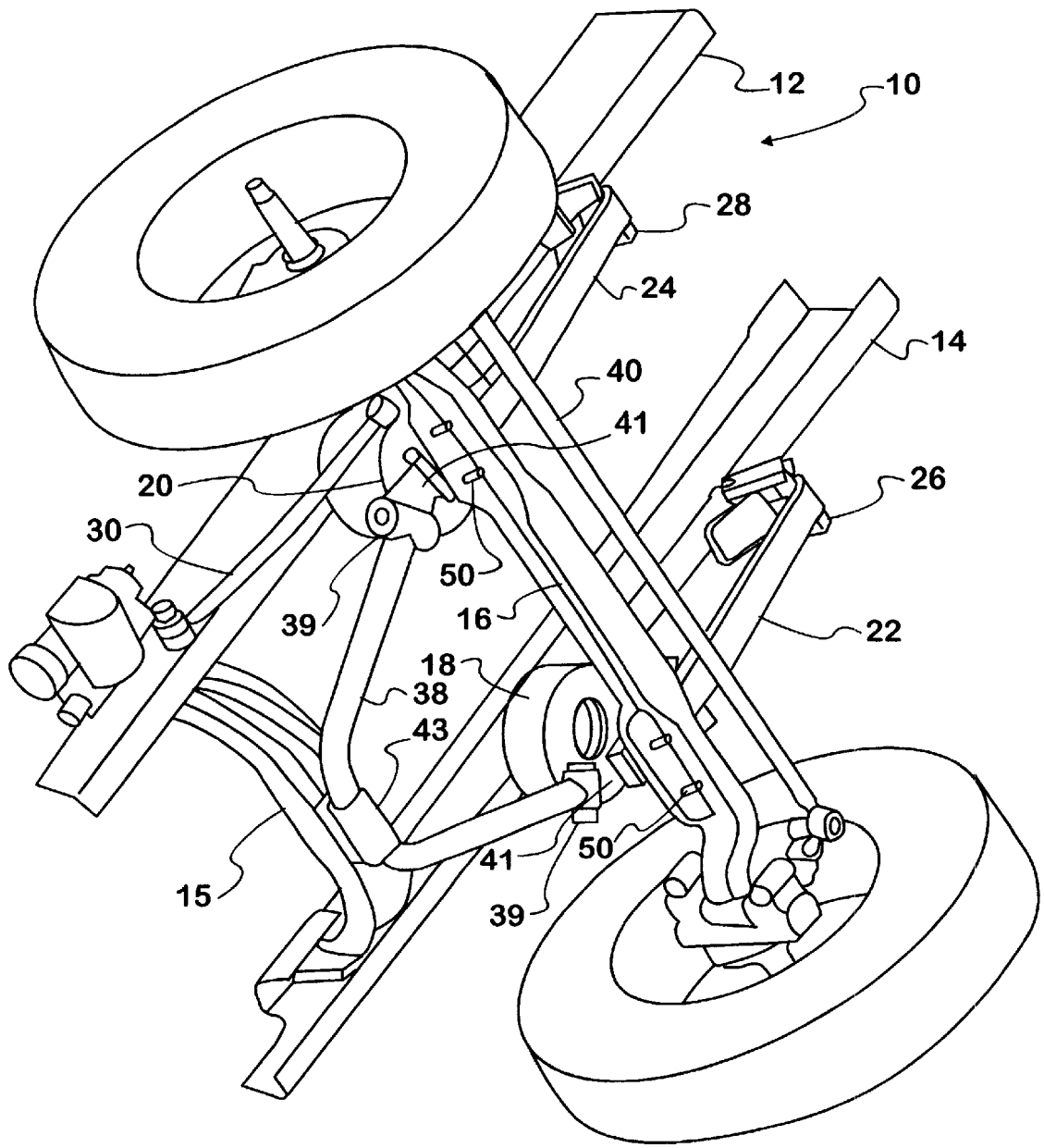
FIG. 2 is a perspective view of the vehicle frame further illustrating the inventive suspension system.

FIG. 2 is a bottom perspective view of the suspension system better illustrating the joining of leading arms 22 and 24 to steering axle 16 by U-bolts 50. As may be seen, leading arms 22 and 24 rigidly connect to straight axle 16 substantially adjacent to the opposing ends of the steering axle 16. Bushing housings 41 for bushings 39 on V-link member 38 also depend from and are rigidly connected to steering axle 16 by the same U-bolts 50. Air springs 18 and 20 are illustrated mounted directly above bushing housings 39 and the respective ends of leading arms 22 and 24. This air spring geometry is only one possibility and other geometries are possible.

Figure 3:
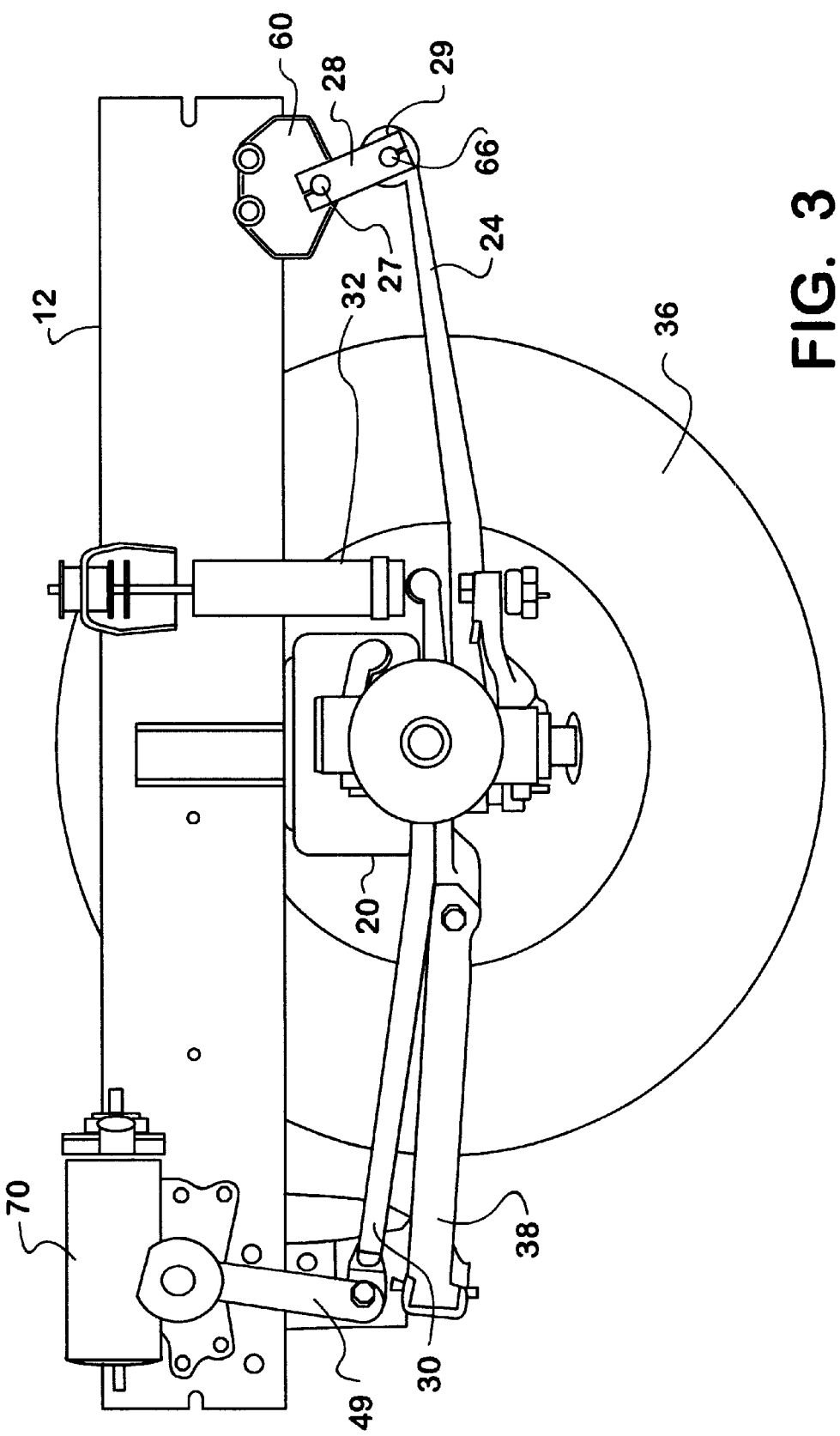
FIG. 3 is a side elevation of the suspension system.

FIG. 3 is a side elevation of a right side suspension assembly unit. Draglink 30 can be longitudinally translated by movement of pitman arm 49, which is in turn controlled by a steering gear unit 70. Left side leading arm 24, as previously described, can translate by movement of the shackle assembly 28 on pivot bushings 27 and 29. Shackle assembly 28 comprises a substantially downward oriented connecting rod 66 positioned on a frame bracket 60 which is bolted to side rail arm 12. The construction of shackle assembly 26 (not shown) is substantially similar to the construction of shackle assembly 28.

As previously described, the anti-dive properties of the preferred embodiment are achieved by transmitting anti-torque reaction force back onto leading arms 24 and 22 to their respective shackle assemblies 28 and 26, which in turn force frame 10 upward. The geometry represents a simplification over the prior art by allowing elimination of the lateral track bar.

While the invention is shown in only one of its forms, it is not thus limited but is susceptible to various changes and modifications without departing from the spirit and scope of the invention.

What is claimed is:

1. A suspension system for a vehicle having an elongated, supported body and a steering axle positioned below the supported body and transverse to the elongated, supported body, the suspension system comprising:

a V-shaped link attached at an apex and at two endpoints to the elongated, supported body and the steering axle, where attachment to the elongated, supported body is longitudinally displaced from the steering axle;

pivot mounts engaging the apex and the endpoints, the pivot mount for the apex providing an axis of rotation for the V-shaped link parallel to the steering axle;

a pair of longitudinally translating couplings, one each depending from opposite sides of the elongated, supported body at positions which are longitudinally displaced from the steering axle in a direction opposite to the longitudinal displacement from the steering axle of the attachment of the V-shaped link to the supported body;

first and second arms, each rigidly connected at one end to mutually spaced locations on the steering axle and at a remaining end to one of the pair of longitudinally translating couplings; and first and second springs mounted with respect to the supported body and the steering axle for supporting the elongated, supported body from the steering axle.

2. A suspension system as claimed in claim 1, wherein the V-shaped link is attached as a trailing member and the first and second arms are mounted as leading members.

3. A suspension system as claimed in claim 2, wherein the supported body includes a frame having a steering gear, a pitman arm extending from the steering gear, a draglink coupled between a wheel mounted on the steering axle and the pitman arm as a trailing member with a pivot mounting forward of the steering axle.

4. A suspension system as claimed in claim 3, wherein the springs are controllable rate springs mounted on top of the steering axle under the supported body.

5. A suspension system as claimed in claim 4, the elongated, supported body having a pair of side rails perpendicular to the steering axle and a cross support between the side rails parallel to the steering axle and longitudinally displaced from the steering axle, the pivot mount engaging the apex of the V-shaped link depending from the cross member between the side rails and the opposing ends of the V-shaped link being connected by bushings to spaced locations on the steering axle.

6. A suspension system for a vehicle having a longitudinally extended body and a steering axle, the suspension system comprising;

right side and left side springs mounted with respect to the steering axle to support the longitudinally extended body along left and right sides from the steering axle;

right side and left side longitudinally translating mounts, located on the right and left sides of the longitudinally extended body, respectively, aft of the steering axle;

right side and left side leading arms connected between the right and left side longitudinally translating mounts and latitudinally spaced locations on the steering axle; and a trailing V-shaped link member mounted between the longitudinally extended body and the steering axle;

a transverse cross member mounted orthogonally with respect to the left and right sides of the longitudinally extended body and forward of the steering axle, the trailing V-shaped link member being pivotally mounted to the transverse cross member cross member and to spaced locations on the steering axle; and first and second wheels pivotally mounted to opposite ends of the steering axle;

a wheel steering knuckle coupled to the first wheel;

a steering gear depending from the longitudinally extended body;

a pitman arm extending from the steering gear; and a trailing draglink connected between the pitman arm and the wheel steering knuckle.

7. A suspension system as claimed in claim 6, wherein the right and left side springs are mounted over the right and left side leading arms.

8. A suspension system as claimed in claim 7, wherein the right and left side springs are controllable rate springs.

9. A suspension system for a vehicle body having a forward end, an aft end and a steering axle, the suspension system comprising:

a spring system supporting the body from the axle;

a V-shaped link member having an apex and opposing ends, pivotally connected to both the body and the axle as a trailing member for constraining fore to aft movement of the steering axle, side to side displacement of the axle and body roll;

first and second translatable mounts depending from the body aft of the steering axle;

first and second leading arms suspended from the first and second translatable mounts, respectively, to permit fore to aft translation of the first and second leading arms relative to the body;

rigid connectors at the spaced locations on the steering axle for rigidly connecting the first and second leading arms to the steering axle;

means for damping motion of the body on the axle.

10. A suspension system as claimed in claim 9, wherein the spring system comprises first and second controllable rate springs.

11. A suspension system as claimed in claim 10, wherein the V-shaped link member is pivotally coupled at the apex to the body at a point forward from the axle and at opposing ends to spaced locations on the axle.

12. A suspension system for a vehicle having an elongated, supported body and a steering axle positioned below the supported body across the direction of elongation of the supported body, the a V-shaped link pivotally mounted at a vertex to the supported body with a rotational axis parallel to the steering axle and at endpoints to the steering axle, where the mounting to the supported body is longitudinally displaced from the steering axle;

first and second arms connected, respectively, to locations on the steering axle which are latitudinally spaced relative to the direction of elongation of the supported body, the first and second arms each having longitudinally translating couplings to the supported body which are longitudinally displaced from the steering axle in a direction opposite to the direction of longitudinal displacement from the steering axle of the mounting of the link to the supported body, and with the first and second arms being rigidly coupled to the steering axle; and first and second springs mounted with respect to the supported body and the steering axle for supporting the supported body from the steering axle.

* * * * *